April 11, 1933. E. WARNER 1,903,539
IMPLEMENT FOR PLAYING THE GAME OF CAT
Filed April 1, 1930
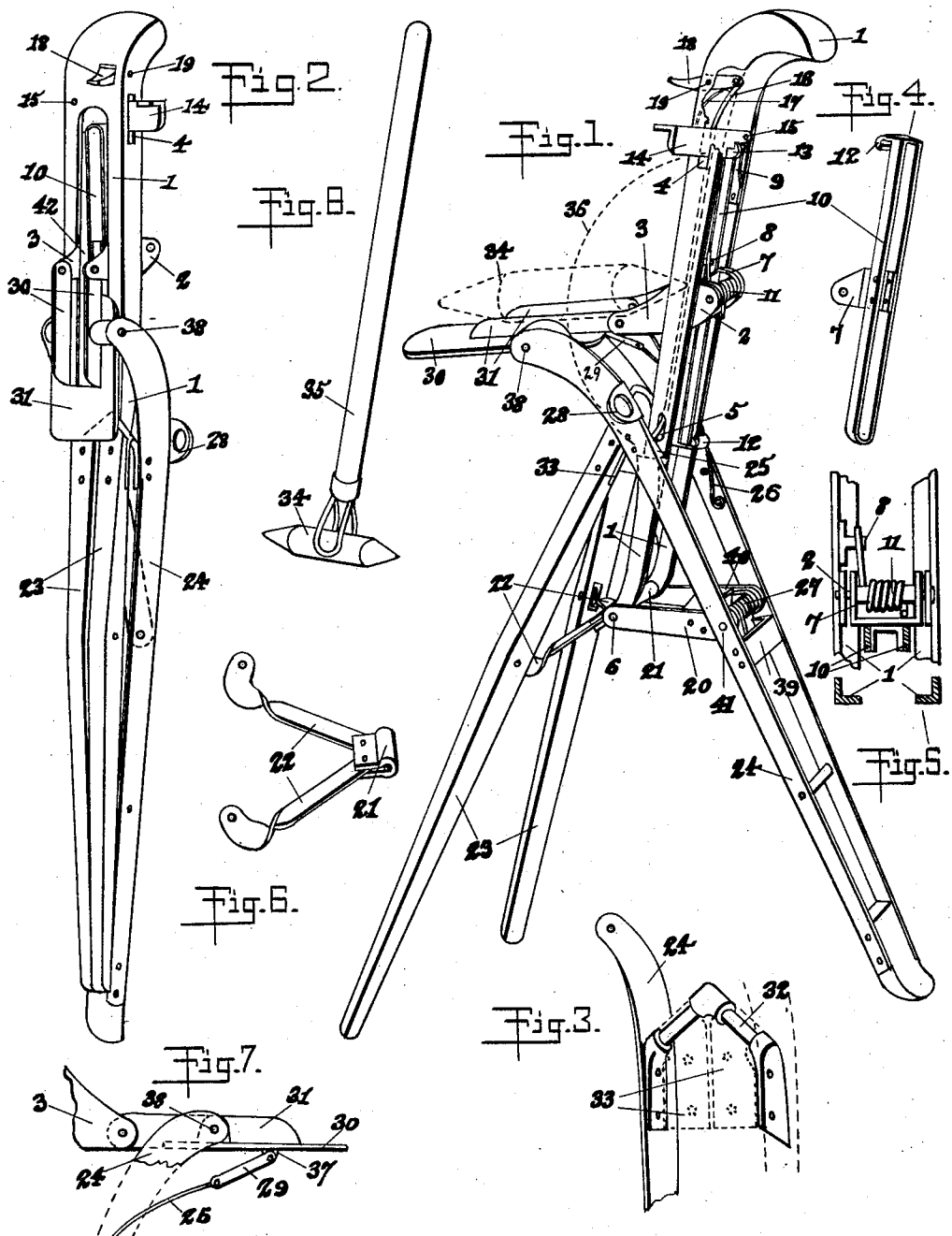
INVENTOR.
Edward Warner Patented Apr. 11, 1933

1,903,539

UNITED STATES PATENT OFFICE

EDWARD WARNER, OF UNION CITY, NEW JERSEY

IMPLEMENT FOR PLAYING THE GAME OF CAT

Application filed April 1, 1930. Serial No. 440,683.

A cat, it may be explained is a round block of wood about five inches long pointed at both ends, and the manner of playing therewith is to trip or hurtle it in the air by striking one of its pointed ends with a stick or a bat as it lies on the ground and while it is still in the air and before it returns to the ground to project it forward with a second blow with the bat. This play which has a vital and an intrinsic interest is confined mostly to young boys who on the attainment of their larger growth abandon it entirely. The reason for this is,— the busy and crowded neighborhoods where it has habitually been played discourage it, and there has been a lack of variety of games to which it has been adjusted, and most important, the fatigue that the enlarged human frame of advanced years experiences in stooping low to trip the cat from the ground more than offsets the recreational pleasure derived from the play and hence it is permitted to fall into disuse.

It is the aim of my invention to overcome all of these objections, by providing a better base from which to trip the cat in a platform raised a convenient height above the ground, that may be easily expanded and collapsed, light of weight and easily carried about; a bat with a spring clamp at one of its ends adapted to pick up a cat from the ground without stooping is used in connection with this platform; it is illustrated in the accompanying drawing but is not included in this invention. The stooping feature of the play is in this wise eliminated; and by these means I have aimed to make the game of cat an acceptable sport and recreation for all persons of either sex or any age; a play to which many sets of rules may be applied or that may be played by the individual without any rule, and that is peculiarly adapted to be played in the broad open country and be a beneficial addition to the out of door life of the populace, inducing it to more frequent recourse to the recuperative influences of nature. There is included in my invention mechanical means for hurling a cat in the air in the form of a swinging striking-beam, which may be used at the option of the player. I submit the drawing illustrative of any invention comprising eight figures the parts of which are indexed by numbers identical in all of the figures:

Fig. 1 is a rearward perspective view of the platform expanded and set up for use, with its restraining catches 25 in engagement, and a cat in dotted outline resting thereon.

Fig. 2 shows the platform in collapsed and more portable form, to which it reverts when the trigger 18, is pulled; impelled to and held in this form by the springs 27 and 26.

Fig. 3 illustrates the hipped formation of the hinges of the legs of the platform which facilitates their opening in the form of a tripod.

Fig. 4 is a swinging striking beam that provides mechanical means for hurling a cat in the air which may be used optionally. In action it moves upward along the dotted line 36, shown in Fig. 1.

Fig. 5 is a rearward view of a fragment of the handle of the platform, showing the mounting therein of the striking-beam with its impelling spring, and with a section of the part 10, in a horizontal position.

Fig. 6 shows the motivating levers of the forward legs of the platform which permit of a vertical and a lateral hinge movement.

Fig. 7 shows the mounting of the spring 26, which acts as an auxiliary aid in collapsing the platform.

Fig. 8 is an illustration of a bat with a spring clamp at one of its ends with a cat held in the same, showing how a cat may be raised from the ground without stooping for it.

The platform 30, as shown in Fig. 2, has the rails 31, 31, turned up from its middle area leaving an open space in the same; the rails 31, 31, have rounded forward ends and holes in their rearward ends, and at their sides on the platform 30, are the pivots 38, 38, and to the latter are hinged the two upper extensions of the leg 24; near the upper end of the latter to the extensions thereof is secured the hipped hinge spindles 32, shown in Fig. 3, with the butts 33, 33, flexibly mounted thereon to which latter are riveted the forward legs 23, 23. Through the agency of the hipped hinges 32, 33, the legs 23, 23, and 24, in opening assume the form of a tripod. The levers 20, 20, connected by a crossplate 40, are hingedly mounted with the spring 27, on the pin 41, in the rearward leg 24; the latter has a crossplate 39, below the spring 27, and the ends of the latter bear respectively on the crossplates 39, and 40. The spring 27, provides the force required to collapse the platform 30, and the legs 23, 23, and 24. A handle 1, with its lower end passed down between the extensions of the leg 24, has two rearward projections 2, 2, and two forward projections 3, 3, the latter are hinged respectively to the rearward ends of the rails 31, 31, and the lower end of the handle 1. The forward ends of the levers 20, 20, and the hinge butt 21 are hingedly connected together on the pin 6, the levers 22, 22, are hinged in the butt 21, to move, laterally as shown in Fig. 6, and their forward ends are adapted to move vertically and are hinged to the legs 23, 23, in slots in the same. The hinged set-up of the levers 22, 22, is mechanically responsive to the triangular divergence of the legs 23, 23, and 24, in their opening. A spring 26, is secured to an extension of the leg 24, as shown in Figs. 1 and 7, to serve as an aid in collapsing the platform 30, the latter has a lug 37, through which it is hingedly connected with the spring 26, by the link 29. The handle 1, and the leg 24, are each provided with a catch as indicated at 25, Fig. 1, that come in engagement when the platform and legs are expanded and hold them in that condition. In the upper part of the handle 1, is pivoted at 19, the trigger 18, and a spring 17 on the handle 1, bears on the inner end of the trigger 18, and to the latter is hinged a shunting-rod 16, which passes down through the inside of the handle 1, through an opening 5, in the same and bears against the catch 25, on the leg 24. A pull on the trigger 18, when the platform is as shown in Fig. 1, causes the shunting-rod 16 to disengage the catches 25, 25, when the spring 27, aided by the spring 26,—which latter could be dispensed with,—automatically collapses the platform with its legs in the form shown in Fig. 2. It will be noticed in Fig. 2, that the rearward leg 24, extends below the legs 23, 23, the reason for this is, that to open the platform it is taken hold of by the handle 1, and with the foot of the leg 24, resting on the ground pressed downward thus counteracting the springs 27 and 26, until the catches 25, 25, clinch, the forward legs 23, 23, in opening in this operation being shorter than the leg 24, avoid scraping on the ground. The foregoing is the designed method for opening the platform. The advantages in my invention beside overcoming the low stoop in the game of cat are several. The platform offers a better base from which to trip the cat than the irregular surface of the ground sometimes covered with vegetable growths or protruding stones; the rounded corners of the rails 31, 31, provide a perfect fulcrum to tilt the cat over and its forward point when struck with a bat makes a glancing contact with the plane 30, lying before it giving the cat a rearward ascensional impulse; the rearward end of the cat lying easily within an open guideway 42, of the handle 1, shown in Fig. 2, is guarded against too wide lateral deflection by the said guideway 42, so that the cat rises within easy range of the second blow in batting. Mechanical means for hurling a cat in the air are included in my invention which may be used optionally by the individual playing alone by himself and subject to no rules; for this purpose a swinging striking-beam shown more clearly in Figs. 4 and 5 is provided: The beam 10, has secured at its center the connecting member with the lugs 7, 7, and through these with the spring 11, it is mounted on a pin in the rearward projections 2, 2 of the handle 1, to swing in the guideway 42 of the latter and the opening between the rails 31, 31; one end of the spring 11, bears on the projection 8 of the handle 1, its other end bears on the part 7, of the striking beam, thus being tensioned to swing the latter along the dotted line 36, knocking a cat that may rest on the platform in the air. A hook 12 is at the end of the striking beam 10, opposite its striking end; a lever 14, passing through the opening 4 of the handle 1, has on it a catch 13, and is hinged in the handle 1 to the pivot 15; a spring 9 secured to the handle 1, bears on the lever 14, and facilitates its engagement with the hook 12 of the striking beam 10, when it is turned up and tensioned for action. A tap on the end of the lever 14, protruding from the handle 1, liberates the striking-beam 10, to toss a cat in the air. Having given a complete exposition of my invention in the foregoing, I, in the following, set forth the claims I make regarding the same.

I claim:

1. A portable platform for the purpose described comprising a rest for a cat, a plane before the said rest on which the forward point of a cat may glance on being struck with a bat, rising above the platform a handle with an open way therein to guide the rearward end of a cat in its upward ascent, and underpinning to raise the whole above the ground.

2. A portable platform for the purpose described comprising a rest for a cat, a plane before the said rest on which the forward point of a cat may glance on being struck with a bat, mechanical means for hurling a cat in the air, and underpinning adaptable to be collapsed and expanded supporting the said platform.

3. A portable and normally collapsed platform that may be expanded from which a cat as described may be hurtled in the air by a stroke with a bat, collapsible and expandible underpinning secured to the said platform, means in cooperation with a handle which when downward pressure is put thereon and part of the said underpinning rests on the ground expands the platform and the underpinning means for holding the said platform and underpinning expanded, and means permitting the same to collapse.

4. A portable platform normally collapsed that may be expanded for the purpose described comprising a rest for a cat, a plane before the said rest on which the forward point of a cat may glance on being struck with a bat, mechanical means for hurling a cat in the air, tripodal underpinning supporting the said platform adaptable to be collapsed and expanded, means in cooperation with a handle which when downward pressure is put thereon and part of the said underpinning rests on the ground expands the said platform and underpinning, means for holding the said platform and underpinning expanded, and means permitting the same, to be collapsed.

5. In a portable platform for the purpose described, two forward legs, a longer rearward leg with two upward rising extensions, the three legs with the rearward one reaching above and below the forward ones hinged together adaptably to open in a tripod, a platform with two rails thereon forming a rest or seat for a cat, the said platform hinged near its center to rock in the upper ends of the rearward leg, a handle with two forward projections and an open guideway for the rearward end of a cat, the lower end of the handle passing between the extensions of the rearward leg, the forward projections of the handle hinged severally to the rearward ends of the rails of the platform, three levers hinged centrally with the lower end of the aforenamed handle accommodative of the divergent movement of the three aforenamed legs to which the other ends of the levers are severally hinged, a spring mounted on the rearward leg and bearing on the lever hinged thereto to effect the collapsing of the platform and the legs, a catch on each—the rearward leg and the handle that come in engagement when the platform and legs are practically expanded and hold them so, a trigger passing through the handle near its top and hinged thereat, a spring secured to the handle and bearing on the inner end of the said trigger to hold it raised, a shunting-rod hinged to the inner end of the said trigger and passing down the handle and through an opening thereof bearing against the catch on the rearward leg thus when the said trigger is pulled disengaging the catch and permitting the collapsing of the platform and the legs.

6. In a portable platform for the purpose described, two forward legs, a longer rearward leg with two upward rising extensions, the three legs with the rearward one reaching above and below the forward ones hinged together adaptably to open in a tripod, a platform with two rails with rounded forward ends forming a rest or seat for a cat thereon, a passageway in the platform between the said rails, the said platform hinged near its center to rock in the two upper ends of the aforenamed rearward leg, a handle with two forward and two rearward projections and an open guideway for the rearward end of a cat, the lower end of the handle passing between the extensions of the aforenamed rearward leg, the forward ends of the projections of the handle hinged severally to the rearward ends of the rails of the aforenamed platform, three levers hinged together centrally with the lower end of the aforenamed handle accommodative of the divergent movement of the three aforenamed legs to which the other ends of the levers are severally hinged, a spring mounted on the rearward leg and bearing on the lever hinged thereto to effect collapsing of the platform and the legs, a catch on each—the rearward leg and the handle that come in engagement when the platform and the legs are practically expanded and retain them so, a trigger passing through the handle near its top and hinged thereat, a spring secured to the handle and bearing on the inner end of the trigger to hold it raised, a shunting-rod hinged to the inner end of the trigger and passing down the handle and through an opening thereof and bearing against the catch on the rearward leg thus when the trigger is pulled disengaging the catch and permitting the collapsing of the platform and the legs, a striking-beam with a hooked end opposite its striking end mounted near its center on a pin in the rearward projections of the handle with a spring adaptably disposed and tensioned to drive it through the guideway of the handle and passageway in the platform in the act of hurling a cat in the air that may rest on the latter, a lever with a catch elastically and adaptably mounted in the upper part of the handle to engage the hooked end of the striking-beam when the latter is tensioned for action, the catch releasable by a tap on the end of its lever which protrudes through an opening in the handle.

7. In a portable platform for the purpose described, two forward legs, a longer rearward leg with two upwardly rising extensions, the three legs with the rearward one reaching above and below the forward ones hinged together so as to be capable of opening into a tripod, hingedly connected with said tripod, a platform with a rest or seat for a cat thereon, an upwardly rising handle hingedly secured to the aforenamed platform, the lower end of the said handle hinged centrally to an end of each of three levers, the other ends of the three said levers hinged severally to the three legs of the tripod accommodative of their divergent movement, elastic means to hold the platform and legs normally collapsed and that permit of the expansion of the same by resting a foot of one of its legs on the ground and exerting a downward pressure on the handle, a catch such that when the platform and legs are expanded will hold them so, a trigger at the top of the handle connected with means to release the said catch thus permitting the platform and legs to collapse.

EDWARD WARNER.